United States Patent [19] [11] 4,127,694

Murphy et al. [45] Nov. 28, 1978

[54] FABRIC TREATMENT COMPOSITIONS

[75] Inventors: Alan P. Murphy, Cincinnati; Fred M. Habermehl, III, Loveland, both of Ohio

[73] Assignee: The Procter & Gamble Company, Cincinnati, Ohio

[21] Appl. No.: 440,931

[22] Filed: Feb. 8, 1974

[51] Int. Cl.$^2$ .......... B32B 7/00

[52] U.S. Cl. .......... 428/245; 252/8.6; 252/8.9; 252/91; 427/11; 427/242; 428/260; 428/264; 428/289

[58] Field of Search .......... 252/8.9, 8.6, 9.1, DIG. 1; 427/11, 242; 428/224, 213, 214, 245, 260, 264, 289

[56] References Cited

U.S. PATENT DOCUMENTS

| | | | |
|---|---|---|---|
| 3,632,396 | 1/1972 | Perez-Zamora | 252/8.6 |
| 3,686,025 | 8/1972 | Morton | 428/214 |
| 3,974,076 | 8/1976 | Wiersema et al. | 252/8.9 |

OTHER PUBLICATIONS

"Textile Chemicals and Auxiliaries" Speel and Schwarz - Reinhold Publishing Corp., New York, Chap. 10, p. 222.

*Primary Examiner*—James J. Bell
*Attorney, Agent, or Firm*—Richard C. Witte; Jerry J. Yetter; Thomas H. O'Flaherty

[57] ABSTRACT

A nonionic, highly ethoxylated anti-static agent, preferably in combination with a fabric softening composition comprising particular mixtures of mono-, di- and triglycerides and fatty alcohols, is applied to fabrics in an automatic dryer.

5 Claims, No Drawings

FABRIC TREATMENT COMPOSITIONS

BACKGROUND OF THE INVENTION

The present invention encompasses a means for providing anti-static and softening benefits to fabrics in an automatic dryer. More specifically, certain hygroscopic ethoxylated materials are employed to provide anti-static benefits on fabrics. The hygroscopic anti-static agents herein are conveniently formulated in combination with mixtures of monoglycerides, diglycerides, triglycerides and fatty alcohols which concurrently provide through-the-dryer fabric softening. The anti-static and mixed anti-static/softening compositions are preferably used in combination with a dispensing means adapted for use in an automatic dryer.

Treatment in an automatic clothes dryer has been shown to be an effective means for imparting desirable tactile properties to fabrics. For example, it is becoming common to soften fabrics in an automatic clothes dryer rather than during the rinse cycle of a laundering operation.

Fabric "softness" is an expression well-defined in the art and is usually understood to be that quality of the treated fabric whereby its handle or texture is smooth, pliable and fluffy to the touch. Various chemical compounds have long been known to possess the ability to soften fabrics during a laundering operation.

Fabric softness also connotes the absence of static "cling" in the fabrics, and the commonly used quaternary fabric softeners provide both softening and anti-static benefits when applied to fabrics. Indeed, with fabrics such as nylon and polyester, the user is more able to perceive and appreciate an anti-static benefit than a true softening benefit.

Cationic anti-static softening compounds and compositions designed for application to fabrics in an automatic dryer have been the subject of recent innovations. (See, for example, U.S. Pat. Nos. 3,632,396 and 3,686,025.) Other materials have been suggested for use as dryer-added fabric softeners; see, for example, U.S. Pat. No. 3,676,199 and the copending application of Murphy and Habermehl, Ser. No. 417,329, filed Nov. 19, 1973, now U.S. Pat. No. 4,000,340. Included among these prior softening compositions are various glycerides in combination with oil-soluble, lower-ethoxylated surfactants. Triglyceride fabric treating agents are disclosed in U.S. Pat. No. 3,785,973.

The common quaternary ammonium anti-static agents are not indicated for use in such compositions since the cationic quats and anionic surfactants undesirably interact. Since the glyceride softeners do not, themselves, possess substantial anti-static properties, it is desirable to provide compatible, non-cationic anti-static agents for use therewith.

It has now been discovered that certain highly ethoxylated, hygroscopic materials can be applied to fabrics to provide an anti-static effect thereto. The ethoxylates herein are highly water-soluble and are not particularly useful anti-static agents when employed in common fashion in an aqueous rinse bath, inasmuch as they are easily removed from fabrics by rinsing. Accordingly, such ethoxylates have not been widely recognized for use as anti-stats in laundering operations. It has now been found that such highly ethoxylated materials provide useful anti-static effects when applied to fabrics in a clothes dryer, since they are not removed from the fabrics by a subsequent rinsing step. Moreover, the ethoxylated anti-stats herein can be applied to fabrics in combination with glyceride mixtures particularly adapted for use as dryer-added fabric softeners.

The ethoxylated anti-stats herein are conveniently provided in combination with a dispensing means which releases a pre-determined, effective amount of the anti-stat onto fabrics in an automatic clothes dryer. Mixed glyceride fabric softeners can optionally be included with the dispensing means to concurrently soften the fabrics.

It is an object of the present invention to provide a means for imparting an anti-static benefit to fabrics in an automatic dryer.

Another object herein is to provide an article of manufacture adapted for use in an automatic dryer to impart anti-static and softness benefits to fabrics.

These and other objects are obtained herein as will be seen from the following disclosure.

SUMMARY OF THE INVENTION

In its broadest aspect, the present invention encompasses a process for imparting an anti-static effect to fabrics in an automatic dryer comprising commingling pieces of damp fabric by tumbling said fabrics under heat in a clothes dryer with an effective, i.e., static-controlling, amount of a hygroscopic, ethoxylated surfactant of the type more fully described hereinafter.

In a preferred mode, the process herein is carried out by means of an article of manufacture especially adapted for use in an automatic dryer comprising a static-controlling amount of a hygroscopic, ethoxylated surfactant in releasable combination with a dispensing means.

In an optional mode, the anti-static agent comprising the hygroscopic surfactant is applied to the fabrics in combination with a softening amount of a glyceride fabric softener of the type disclosed hereinafter. An article comprising a static-controlling amount of the hygroscopic anti-stat and a softening amount of the glyceride softener which is especially adapted for use in an automatic clothes dryer is also provided.

DETAILED DESCRIPTION OF THE INVENTION

By the present invention, damp fabrics are contacted with a hygroscopic anti-static agent in a clothes dryer. The heat and tumbling action of the dryer serves to disperse the anti-static agent evenly over all fabric surfaces, while concurrently drying the fabrics. The moisture originally present in the damp fabrics aids in achieving a uniform dispersion of the anti-static agent. On removal from the dryer, the hygroscopic nature of the anti-static agent causes a minute quantity of atmospheric moisture to be immediately sorbed on the fabric surfaces and an anti-static effect is achieved.

The anti-static agents herein can be employed in combination with fabric softeners and in the form of dryer-added articles, all as more fully described hereinafter.

Ethoxylated Anti-Stats

The dryer-added fabric conditioning compositions and articles herein comprise a hygroscopic, nonionic material. While not intending to be limited by theory, it appears that the tactilely imperceptible amount of moisture sorbed by the hygroscopic anti-stats is sufficient to raise the surface conductivity of fabrics treated therewith by a factor of a million-fold, or greater. This increased surface conductivity serves to dispel the undesired static electrical charges in a rapid and efficient manner.

The ethoxylated anti-static agents herein include those materials which fall in the general class of ethoxylated surfactants. A listing of such hygroscopic, highly ethoxylated surfactants now found to be useful as through-the-dryer anti-stats appears in McCutcheon's "Detergents and Emulsifiers" North American Edition, 1973 Annual, incorporated herein by reference.

Preferred hygroscopic surfactants which can be employed as anti-static agents in the manner of this invention include the nonionic ethoxylates of the general formula $$R-O-(C_2H_4O)_x-C_2H_4OH$$

where R is selected from the group consisting of primary, secondary, and branched chain alkyl hydrocarbyl moieties; primary, secondary and branched chain alkenyl hydrocarbyl moieties; and primary, secondary and branched chain alkyl- and alkenyl-substituted phenolic hydrocarbyl moieties; said hydrocarbyl moieties having a hydrocarbyl chain length of from about 6 to about 20, preferably 10 to 18, carbon atoms. In the general formula for the ethoxylated nonionic anti-stats herein, $x$ is an integer of at least about 20, preferably 25 to about 100, most preferably about 35 to about 50.

Specific examples of nonionic hygroscopic surfactants useful as the anti-stats of this invention are as follows. The examples are only by way of exemplification, and are not intended to be limiting of such materials.

Straight-Chain, Primary Alcohol Ethoxylates

The hygroscopic ethoxylates of hexa-, hepta-, octa-, nona-, deca-, undeca-, dodeca-, tetradeca-, hexadeca- and octadeca-alcohols condensed with at least 20 moles of ethylene oxide are useful herein. Exemplary ethoxylates of primary alcohols include n-$C_{10}$EO(30), n-$C_{12}$EO(40) and n-$C_{16}$EO(50). The higher ethoxylates of mixed natural or synthetic alcohols in the "coconut" and "tallow" chain length range are also useful herein. Specific examples of such materials include coconutalkyl EO(45) and tallow-alkyl EO(45).

Straight-Chain, Secondary Alcohol Ethoxylates

The hygroscopic ethoxylates of 2-decanol, 2-tetradecanol, 3-hexadecanol, 2-octadecanol, 4-eicosanol, and 5-eicosanol are useful anti-static agents in the context of this invention. Exemplary ethoxylated secondary alcohols useful herein as the anti-static agent are: 2-$C_{10}$EO(40), 2-$C_{12}$EO(45), 2-$C_{14}$EO(60), 2-$C_{16}$EO(60), 4-$C_{20}$EO(80), 2-$C_{16}$EO(100) and 2-$C_{10}$EO(20). Commercial mixtures of secondary alcohols having an average hydrocarbyl chain length of 8 to 20 carbon atoms condensed with an average of 20–100 moles of ethylene oxide per mole of alcohol are also useful herein.

Alkyl Phenolic Ethoxylates

As in the case of alcohol ethoxylates, the hygroscopic ethoxylates of alkylphenols, particularly monohydric alkylphenols, are useful as the anti-static agent of the instant invention. The $EO_{20}$–$EO_{100}$ ethoxylates of commercially available alkyl phenols such as p-octyl phenol and p-nonyl phenol are readily prepared by well known condensation reactions.

Exemplary ethoxylated alkyl phenols useful as the anti-static agent herein are: p-octylphenol EO(45), p-nonylphenol EO(45) and p-decylphenol EO(40).

Olefinic Ethoxylates

The alkenyl alcohols, both primary and secondary, and alkenyl phenols corresponding to those disclosed immediately hereinabove, can be ethoxylated with from 20 to 100 moles of ethylene oxide and thereby rendered hygroscopic and useful as the anti-static agent herein. Exemplary alkenyl ethoxylates herein include 2-n-dodecenol EO(60), 3-n-tetradecenol EO(30), p-(2-nonyl)phenol EO(40) and 2-tetradecen-4-ol EO(45).

Branched Chain Ethoxylates

Branched chain primary and secondary alcohols are available from the well known "OXO" process and can be ethoxylated and employed as the anti-static agents herein. Exemplary branched-chain alkoxylates are as follows: 2-methyl-1-dodecanol EO(60); 3-ethyl-2-tetradecanol EO(100); 2-methyl-1-hexadecanol EO(35), and the like.

As can be seen by the foregoing, a wide variety of highly hygroscopic ethoxylated nonionic surfactants are useful as the anti-static agent herein. It will be recognized that the designation of the degree of ethoxylation of the listed compounds in an average value, and commercial materials contain mixtures of hydrocarbyl materials having differing degrees of ethoxylation centering around an average value.

The preferred ethoxylates herein are the $EO_{35}$ to $EO_{50}$ ethoxylates of mixed tallow alcohols and mixed coconut alcohols. These commercially available materials are highly hygroscopic and quite effective anti-stats when employed in the manner of this invention. Coconutalkyl EO(45) and tallowalkyl EO(45) are especially preferred mixed alcohol ethoxylates for use herein. Lauryl EO(45) is also, especially preferred herein.

Glyceride Softener

The anti-static agents herein can optionally be formulated in combination with mixtures of glycerides and glyceride-fatty alcohol mixtures which provide a fabric softening aspect to the compositions herein. The glyceride and mixed glyceride-alcohol softeners herein are selected from materials which are solid or semi-solid at temperatures below about 40° C., but which soften and flow at automatic dryer operating temperatures, i.e., 50° C. to 100° C.

The glyceride softeners herein comprise mixtures of monoglycerides, diglycerides and triglycerides having a melting point range of from about 50° C. to about 100° C., preferably from about 60° C. to about 95° C. Of course, such mixtures do not melt sharply, but gradually soften and flow over a range of temperatures. The flow properties of the glyceride softeners provide even distribution onto fabrics in an automatic dryer. By employing glyceride mixtures having a melting point falling within the stated range, a non-greasy fabric softening effect is secured.

The glyceride mixtures herein can be prepared by admixing pure mono-, di- and tri-glycerides in the relative ratios and proportions disclosed hereinafter to provide mixed compositions which provide a soft, lubricious feel on fabrics. While the individual triglycerides are readily available from natural sources, it is much more difficult to isolate the pure mono- and di-glyceride components, so that such a mixing procedure is not a commercially attractive means for preparing the glyceride mixtures used herein.

Glyceride mixtures of the type useful herein can be more conveniently prepared from natural or synthetic triglycerides by means of a trans-esterification reaction employing glycerine and a base. Such trans-esterification reactions take place in well-known fashion to provide random mixtures of mono-, di- and tri-glycerides, according to the following reaction:

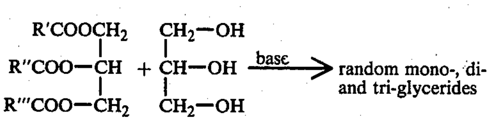

In the equation, groups R′, R″ and R‴ are $C_{10}$–$C_{22}$ alkyl and alkenyl. By selecting the appropriate molar ratios of reactants, it is possible to prepare glyceride mixtures having the desired relative ratios of the mono-, di- and tri-glyceride components.

The trans-esterification reaction takes place by the random migration of the fatty acid groups on the glycerol molecule. Thus, the acyl moieties can be found in random positions on the glycerol moiety at the completion of the reaction. This randomization of acyl groups is immaterial from the standpoint of the instant invention, inasmuch as the randomized glycerides have the appropriate melting point ranges for use herein.

In the trans-esterification, the presence of excessive amounts of base, especially the alkali metal hydroxides, can result in the formation of various amounts of soaps, i.e., the sodium salts of the migrating fatty acids. It has been determined that glyceride mixtures containing greater than about 20% by weight of fatty acid soaps are useful as fabric softeners. However, the presence of such soaps prevents the efficient and complete removal of the glyceride mixtures from the dispensing means used herein during the average time of a drying cycle. Accordingly, it is preferred to employ glyceride mixtures containing less than about 30% by weight of soap when such dispensing means are employed. In order to provide glyceride mixtures containing such minimal amounts of soap, the ratio of sodium hydroxide used in the trans-esterification reaction is simply adjusted so that the combined moles of triglyceride and glycerine is at least about 5 times, preferably at least 5.6 times, that of the base. Alternatively, excess soap can be removed by aqueous washing processes.

The melting point of the glyceride mixtures employed herein depends both on the ratio of the mono-, di- and tri-glyceride components present therein and on the chain lengths of the fatty acids which make up the various glyceride esters. In general, glyceride mixtures containing from about 30% to about 90%, preferably 40% to about 90% by weight of $C_{12}$ to $C_{18}$ monoglycerides; from about 15% to about 60%, preferably 15% to about 50% by weight of $C_{12}$ to $C_{18}$ diglycerides; and from about 1% to about 15%, preferably 1% to about 5%, of $C_{12}$ to $C_{18}$ triglycerides are useful herein. Such mixtures also comprise complex trans-esterification reaction by-products, including soaps, free fatty acids and glycerol compounds.

The foregoing glyceride mixtures are most conveniently prepared by selecting as the precursor material, a triglyceride which, itself, contains substantial amounts of $C_{12}$ to $C_{18}$ esterified acid groups. It is well recognized in the art that certain animal and vegetable fats and oils are comprised mainly of the glyceride esters of the longer-chain fatty acids, whereas other natural triglycerides comprise major amounts of the esters of relatively shorter-chain acids. For example, peanut oil contains up to about 70% by weight of $C_{18}$ fatty acids, with soybean oil, cottonseed oil and lard containing equal, or even greater percentages of the long-chain fatty acids. Moreover, it is recognized that the long-chain fatty acids present in these naturally-occurring glycerides often contain points of unsaturation. The natural glycerides can, in general, be hydrogenated at these points of unsaturation to provide materials which have even higher melting points than the natural materials. It is preferred herein to select such naturally-occurring, high-melting and hydrogenated high-melting triglycerides for use herein as the precursor materials for preparing the mixtures of mono-, di- and tri-glycerides by means of the foregoing trans-esterification reaction.

When using the natural triglycerides as precursors for the glyceride mixtures herein, it will be recognized that up to about 30% by weight of the total fatty acids will be $C_{12}$, and shorter, in chain length. The presence of such shorter chain materials is immaterial, so long as the overall melting point range is obtained.

Preferred precursor materials for the glyceride mixtures herein include lard, winterized lard, tallow, hydrogenated (hardened) tallow, hydrogenated (hardened) soybean oil, and hydrogenated (hardened) peanut oil. Any of these materials can be trans-esterified in the presence of glycerine and base in well-known fashion to provide the glyceride mixtures useful herein.

Inasmuch as the trans-esterification reaction herein proceeds with a random migration of acyl groups, it is not possible to fully characterize the mixed glyceride reaction products except in terms of melting point and amounts of free soap. It is within the purview of the user to select reaction conditions which will result in the desired melting point range and free soap content of the glyceride mixtures.

Especially preferred glyceride mixtures herein comprise the trans-esterified reaction product of hardened tallow fat, glycerine and sodium hydroxide and the trans-esterified reaction product of hardened soybean oil, glycerine and sodium hydroxide having the melting point range set forth above.

A highly preferred glyceride mixture herein comprises the trans-esterified reaction product of hardened tallow fat in a 3 to 10 molar proportion, glycerine in a 2 to 4 molar proportion and sodium hydroxide in a 0.5 to 1.5 molar proportion. Another highly preferred glyceride mixture herein comprises the trans-esterified reaction product of hardened soybean oil in a 3 to 10 molar proportion, glycerine in a 2 to 4 molar proportion and sodium hydroxide in a 0.5 to 1.5 molar proportion.

The glyceride mixtures can be employed herein singly as the optional fabric softening agent, or can be blended with a $C_{10}$–$C_{20}$ fatty alcohol which advantageously modifies the softening properties thereof. The pure fatty alcohols can be employed in combination with the glycerides, but it is more preferred from an economic standpoint to use alcohol mixtures, such as the common fatty alcohol mixtures prepared from coconut and tallow triglycerides. Especially preferred alcohols herein fall within the tallowalkyl range, with the most preferred mixtures being "higher" tallowalkyl alcohols, i.e., those having a substantial portion of the $C_{10}$–$C_{12}$ lower melting alcohols removed.

Preferred fabric softeners herein comprise glyceride mixtures of the type disclosed hereinabove in combination with alcohols at a weight ratio of glyceride:alcohol of from about 7:3 to about 9:1.

As can be seen by the foregoing, the present invention can be carried out by using the anti-static agent as the sole component of the fabric treating composition. In an optional but preferred mode, a fabric treating composition comprising the anti-stat and the fabric softener is applied to fabrics to achieve a dual benefit.

Dispensing Means

The anti-static and mixed anti-static/softening compositions herein are conveniently employed in combination with a dispensing means which evenly distributes the compositions onto fabrics under the heating and tumbling action of an automatic dryer.

Accordingly, the invention encompasses anti-static and softening articles comprising an effective amount of the fabric treating compositions herein in combination with a dispensing means which effectively releases the compositions onto fabrics in an automatic clothes dryer. Such dispensing means can be designed for single usage or for multiple uses.

One such article comprises a sponge material releasably enclosing enough of the composition to effectively impart anti-static, or mixed anti-static and softening, benefits to fabrics during several cycles of clothes. This multi-use article can be made by filling a hollow sponge with about 20 grams of the present compositions. In use, a portion of the composition melts and leaches through the pores of the sponge onto the fabrics in an uniform manner. Such a filled sponge can be used to treat several loads of fabrics in conventional dryers, and has the advantage that it can remain in the dryer after use and is not likely to be misplaced or lost.

Another article comprises a cloth or paper bag releasably enclosing the composition and sealed with hardened plug of the composition. The heat of the dryer opens the bag and releases the fabric treating composition therein.

a highly preferred article herein comprises the fabric treating composition releasably sorbed on, or otherwise affixed to, a flexible paper or woven or non-woven cloth substrate such that the reaction of the automatic dryer removes the fabric treating composition and deposits it on the fabrics. Such flexible substrates are most conveniently provided in a sheet configuration.

The sheet configuration has several advantages. First, effective amounts of the fabric treating compositions for use in conventional dryers can be easily affixed to the substrate by a simple dipping or padding process. Additionally, the relatively flat, thin coating of the fabric treating composition on the sheet is effectively and thoroughly released onto the fabrics which come in contact therewith. Sheets can be easily made which contain a pre-determined amount of the fabric treating composition sufficient to treat a standard (5 lbs.–10 lbs.) dryer load, such that the user need not measure the amount of composition necessary to treat the fabrics.

More specifically, the water-insoluble paper, or woven or non-woven sustrates used in the preferred articles herein can have a dense, or more preferably, open or porous structure. Examples of suitable materials which can be used as substrates herein include paper, woven cloth, and non-woven cloth. The term "cloth" herein means a woven or non-woven substrate for the articles of manufacture, as distinguished from the term "fabric" which encompasses the clothing fabrics being dried in an automatic dryer.

The paper, woven or non-woven substrates useful herein are fully disclosed in U.S. Pat. No. 3,632,396, incorporated herein by reference.

As noted above, the preferred sheeted articles herein can be manufactured by a simple dipping or coating procedure. In a typical procedure, the hygroscopic anti-stat, in the form of a fluid melt, is simply padded onto the sheet. The mixed anti-stat/softener compositions can be conveniently fashioned by homogenizing the glyceride softener mixture and the hygroscopic anti-static by warming in a trough to form a fluid melt. The insoluble substrate is fed through the melt and the composition coats and impregnates the substrate. The substrate is removed from the trough and the fabric treating composition solidifies on the substrate. By controlling the type of substrate and the speed of the substrate through the trough, and effective amount of the fabric treating composition is affixed to a predetermined length and width of substrate.

The preferred anti-static articles herein are provided as 9 in. × 11 in. substrate sheets coated with from about 0.01 g. to about 1 g. of the hygroscopic anti-static agent. Such articles provide sufficient anti-stat to impart an anti-static effect to an average 5 lb. dryer load of damp fabrics.

The preferred anti-static/softening articles herein are provided as 9 in. × 11 in. substrate sheets coated with from about 0.01 g. to about 1 g. of the hygroscopic anti-static agent and from about 1 g. to about 3 g. of the glyceride softener. This article provides an anti-static and softening effect to an average 5 lb. dryer load of damp fabrics.

A highly preferred anti-static/softening article herein consists essentially of: (a) a fabric treating composition consisting essentially of: (i) from about 1 gram to about 3 grams of a glyceride mixture consisting essentially of the trans-esterified glyceride reaction product of a 3:2.6:1 molar mixture of glycerine, sodium hydroxide, and a member selected from the group consisting of hardened soybean oil and hardened tallow fat, (ii) from about 0.5 grams to about 1.0 grams of mixed $C_{12}$ to $C_{18}$ higher tallow fatty alcohols, at a weight ratio of mixed alcohols to glyceride reaction product of 1:9 to 3:7; and (iii) from about 0.1 gram to about 2 grams of a hygroscopic surfactant selected from the group consisting of the $EO_{35}$ to $EO_{50}$ ethoxylates of mixed tallow and mixed coconut alcohols; and (b) said fabric treating composition being releasably affixed to a flexible substrate selected from the group consisting of woven, non-woven and paper sheets, at a weight ratio of fabric treating composition to substrate of from about 50:1 to about 1:50.

Optional Components

The processes and articles herein can employ minor proportions (i.e., usually about 0.1% to about 30% by weight of the fabric treating composition) of various optional ingredients which provide additional fabric conditioning benefits. Such optional ingredients include perfumes, optical brighteners, fumigants, bacteriocides, fungicides, flame retardants, and the like. Specific examples of typical additives useful herein can be found in any current *Year Book of the American Association of Textile Chemists and Colorists.* Since the major proportion of the fabric treating compositions herein is nonionic, the compositions are compatible with all manner of such optional ingredients.

One type of optional ingredient herein includes the well known quaternary ammonium anti-static and fabric softening agents. While the hygroscopic anti-stats herein are quite effective for their intended use, minor proportions of quaternary salts can optionally be employed in combination therewith to provide an added increment of static control, as well as contributing to fabric softness. Specific examples of such quaternary salts include di-(tallowalkyl)dimethylammonium chloride and di-(tallowalkyl)dimethylammonium methylsulfate.

Usage

In the process aspect of this invention the hygroscopic anti-static agent, optionally in combination with the glyceride fabric softener, is used in an effective amount to condition fabrics in an automatic dryer. The effective, i.e., static-controlling, amount of the hygroscopic anti-static agent employed in the manner of this invention will depend somewhat on the type of fabric being treated and the dampness of the surrounding atmosphere. For example, it is well-known that under conditions of low humidity, static control in fabrics is somewhat more difficult to achieve than under conditions of high humidity. Accordingly, the amount of hygroscopic anti-stat employed can be adjusted, depending on the type of fabrics, conditions of humidity, and according to the desires of the user. For most purposes, the hygroscopic anti-stat is applied to fabrics at a rate of about 0.01 gram to about 2.0 grams, preferably 0.01–1.0 gram, per 5 lbs. of fabric.

The optional fabric softener glyceride and mixed glyceride/fatty alcohol compositions are also employed in an effective, i.e., fabric softening, amount in the processes and articles herein. The amount of softener can be varied according to fabric type, the desires of the user, etc. For most purposes, effective fabric softening is secured over a wide range of fabrics by applying the fabric softeners herein to fabrics at a rate of from about 1 gram to about 10 grams, most preferably about 2–3 grams, per 5 lbs. of fabric. Higher usage rates can be employed, if desired, but can result in an undesirable greasiness on the fabrics.

The process herein is carried out in the following manner. Damp fabrics, usually containing from about 1 to about 1.5 times their weight of water, are placed in the drum of an automatic clothes dryer. In practice, such damp fabrics are commonly obtained by laundering, rinsing and spin-drying the fabrics in a standard washing machine. The compositions herein are simply spread uniformly over all fabric surfaces, for example, by sprinkling the composition onto the fabrics from a shaker device. The dryer is then operated in standard fashion to dry the fabrics, usually at a temperature from about 50° C. to about 80° C. for a period from about 10 minutes to about 60 minutes, depending on the fabric load and type. On removal from the dryer, the dried fabrics instantaneously sorb a minute quantity of water which quickly and effectively dissipates static charge.

In a preferred mode, the present process is carried out by fashioning an article comprising the dispensing means of the type hereinabove described in releasable combination with the compositions herein. This article is simply added to a clothes dryer together with the damp fabrics to be treated. The heat and tumbling action of the revolving dryer drum evenly distributes the composition over all fabric surfaces, and dries the fabrics.

The following examples illustrate the present invention, but are not intended to be limiting thereof.

EXAMPLE I

An article of manufacture especially adapted for imparting an anti-static finish to fabrics in an automatic dryer is as follows:

| Composition | |
|---|---|
| Ingredient | Weight % |
| Tallow alchol ethoxylate (45) | 99 |
| Perfume | 1 |
| Substrate | |
| Paper toweling, 2-ply, 10 in. × 11 in. | |

The tallow alcohol ethoxylate (45) is mixed with the perfume and warmed to form a fluid melt. The molten material is padded onto the paper substrate at a rate of 2.5 g./110 in.$^2$ and allowed to dry at room temperature to provide a flexible article suitable for use in an automatic dryer.

The foregoing article, 110 in.$^2$, is placed in an automatic dryer containing 5 lbs. of damp clothing and the dryer is operated at an average temperature of 65° C. for 40 minutes. The clothing is tumbled during the drying operation to provide good contact with the article. At the end of the drying operation the clothes are removed from the dryer. The dried clothes are free from static cling.

In the foregoing Composition the tallow alcohol ethoxylate (45) is replaced by an equivalent amount of tallow alcohol ethoxylate (100);
coconut alcohol ethoxylate (45);
coconut alcohol ethoxylate (100);
n-lauryl alcohol EO(45);
p-nonylphenol EO(60); and
coconut alcohol ethoxylate (20), respectively, and equivalent anti-static results are secured.

EXAMPLE II

An article of manufacture comprising an anti-static fabric softening composition releasably affixed to a non-woven cloth substrate and adapted for use in an automatic dryer is as follows:

| Composition | |
|---|---|
| Ingredient | Weight % |
| Glyceride mixture* | 75 |
| Tallowalkyl alcohols** | 20 |
| Lauryl alcohol ethoxylate (45) | 5 |
| Substrate | |
| Non-woven rayon, 3-denier, ca. 11 inches wide. | |

*Trans-esterified hardened tallow glycerides comprising monoglycerides, diglycerides, and triglycerides in a weight ratio of mono:di: tri, ca. 20:6:1, additionally containing complex mixtures of soaps, glycerine and diglycerol.
**Mixture comprising ca. 10% $C_{14}$, 40% $C_{16}$, 50% $C_{18}$ alcohols.

The cloth substrate is mounted on a tubular roll and a rod is passed through the core and positioned to allow the cloth to unroll when pulled.

The Composition is heated to ca. 70° C. in a trough to provide a homogeneous melt. The substrate is pulled through the trough at a rate of about 50–60 feet per minute and further passed through a pair of rollers which are adjusted to remove excess molten Composition from the substrate.

The speed of the substrate passing through the trough and the pressure of the pair of rollers is adjusted so that 3-5 grams of the Composition are deposited per 110 in.$^2$ of substrate. The substrate is perforated every 10 inches to provide easy separation into sheets having 3-5 g. of the Composition on each sheet. The article is allowed to cool to room temperature, whereby the molten Composition solidifies. The final article remains flexible.

An article prepared in the foregoing manner having a total surface area (both sides) of 220 in.$^2$ is added to a home dryer containing 5 lbs. of wet clothes. The dryer is operated at an average temperature of 67° C. to dry the fabrics. The fabrics are provided with a soft, anti-static finish.

The foregoing illustrates the commercial advantage of the sheet substrates herein in that production speeds of 500-600 linear feet of substrate/minute, and greater, can be coated with the compositions herein. Moreover, the compositions do not foam. Foaming encountered in the preparation of dryer-added fabric treating articles employing high levels of quaternary ammonium salts, as disclosed in the prior art, can cause substantial processing problems in high speed production lines.

The Composition of Example II is modified by replacing one-tenth of the glyceride mixture with di-(tallowalkyl)dimethylammonium methylsulfate and equivalent results are secured.

What is claimed is:

1. An article of manufacture adapted for use in an automatic dryer, comprising:

(a) a fabric treating composition consisting essentially of (i) a static-controlling amount of a hygroscopic surfactant of the formula $$R-O-(C_2H_4O)_x-C_2H_4OH$$

wherein R is selected from the group consisting of primary, secondary and branched chain alkyl hydrocarbyl moieties; primary, secondary and branched chain alkenyl hydrocarbyl moieties; and primary, secondary and branched chain alkyl- and alkenyl-substituted phenolic hydrocarbyl moieties; said hydrocarbyl moieties having a hydrocarbyl chain length of from about 10 to about 18, and wherein $x$ is an integer of from about 35 to about 50, and (ii) a softening amount of a fabric softener consisting essentially of a transesterified mixture of fatty glycerides containing from about 20% to less than about 30% by weight of soap and having a melting point above about 40° C. and a fatty alcohol having about 10 to about 20 carbon atoms at a weight ratio of glycerides:alcohol of from about 7:3 to about 9:1; and (b) a flexible substrate in releasable combination with said fabric treating composition.

2. An article according to claim 1 wherein the anti-static agent is selected from the group consisting of coconutalkyl EO(45), tallowalkyl EO(45), and lauryl alcohol EO(45).

3. An article according to claim 2 wherein the fabric softener comprises the trans-esterified reaction product of hardened tallow fat, glycerine and sodium hydroxide.

4. An article according to claim 2 wherein the fabric softener comprises the trans-esterified reaction product of hardened soybean oil, glycerine and sodium hydroxide.

5. An article according to claim 1, consisting essentially of:

(a) a fabric treating composition consisting essentially of:

(i) from about 1 gram to about 3 grams of a glyceride mixture consisting essentially of the trans-esterified glyceride reaction product of a 3:2.6:1 molar mixture of glycerine, sodium hydroxide, and a member selected from the group consisting of hardened soybean oil and hardened tallow fat, (ii) from about 0.5 grams to about 1 gram of mixed $C_{12}$ to $C_{18}$ higher tallow fatty alcohols; and (iii) from about 0.1 gram to about 2 grams of a hygroscopic surfactant selected from the group consisting of the $EO_{35}$ to $EO_{50}$ ethoxylates of mixed tallow and mixed coconut alcohols; and (b) said fabric treating composition being releasably affixed to a flexible substrate selected from the group consisting of woven, non-woven and paper sheets, at a weight ratio of fabric treating composition to substrate of from about 50:1 to about 1:50.

* * * * *